(12) United States Patent
Zhang et al.

(10) Patent No.: US 11,875,224 B2
(45) Date of Patent: Jan. 16, 2024

(54) ENTITY STEERING OF A RUNNING QUANTUM PROGRAM

(71) Applicant: International Business Machines Corporation, Armonk, NY (US)

(72) Inventors: Helena Zhang, White Plains, NY (US); Zachary Schoenfeld, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 427 days.

(21) Appl. No.: 17/319,504

(22) Filed: May 13, 2021

(65) Prior Publication Data

US 2022/0366286 A1    Nov. 17, 2022

(51) Int. Cl.
| | | |
|---|---|---|
| G06N 10/60 | (2022.01) | |
| G06F 15/16 | (2006.01) | |
| G06N 10/00 | (2022.01) | |
| G06N 10/80 | (2022.01) | |

(52) U.S. Cl.
CPC ............. G06N 10/00 (2019.01); G06F 15/16 (2013.01); G06N 10/60 (2022.01); G06N 10/80 (2022.01)

(58) Field of Classification Search
None
See application file for complete search history.

(56) References Cited

U.S. PATENT DOCUMENTS

| | | | | |
|---|---|---|---|---|
| 10,997,519 B2* | 5/2021 | Gunnels | ............... | G06F 9/4887 |
| 11,314,535 B2* | 4/2022 | Gambetta | ............... | G06F 9/547 |
| 11,449,760 B2* | 9/2022 | Denchev | ............... | G06N 3/126 |
| 11,657,312 B2* | 5/2023 | Akhalwaya | ............ | G06N 10/00 |
| | | | | 706/12 |
| 2019/0164059 A1 | 5/2019 | Denchev et al. | | |
| 2020/0401427 A1 | 12/2020 | Gambetta et al. | | |
| 2021/0256416 A1* | 8/2021 | Bocharov | ............... | G06N 10/60 |

OTHER PUBLICATIONS

Mattoso, et al., "User-Steering of HPC Workflows: State-of-the-art and Future Directions," SWEET'13, Jun. 23, 2013, New York, NY, USA Copyright is held by the owner/author(s), the entire document.
ip.com, "Quantum Developer Visualization Tool (QDVT)," IPCOM000261S8D, IP.com Electronic Publication Date: Mar. 18, 2020, the entire document.
Mell et al., The NIST Definition of Cloud Computing, Recommendations of the National Institute of Standards and Technology, NIST Special Publication 800-145, Sep. 2011, 7 pages.

* cited by examiner

*Primary Examiner* — Leigh M Garbowski
(74) *Attorney, Agent, or Firm* — Amin, Turocy & Watson, LLP

(57) ABSTRACT

Systems, computer-implemented methods, and computer program products to facilitate entity steering of a running quantum program are provided. According to an embodiment, a system can comprise a processor that executes computer executable components stored in memory. The computer executable components can comprise a steering component that adjusts at least one parameter corresponding to a running quantum program to define at least one modified parameter. The computer executable components can further comprise an execution component that executes one or more shots of the running quantum program based on the at least one modified parameter.

20 Claims, 10 Drawing Sheets

ENTITY STEERING OF A RUNNING QUANTUM PROGRAM

BACKGROUND

The embodiments described herein relate to execution of a quantum program, and more specifically, to entity steering of a running quantum program.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that can facilitate entity steering of a running quantum program are described.

According to an embodiment, a system can comprise a processor that executes computer executable components stored in memory. The computer executable components can comprise a steering component that adjusts at least one parameter corresponding to a running quantum program to define at least one modified parameter. The computer executable components can further comprise an execution component that executes one or more shots of the running quantum program based on the at least one modified parameter.

According to another embodiment, a computer-implemented method can comprise adjusting, by a system operatively coupled to a processor, at least one parameter corresponding to a running quantum program to define at least one modified parameter. The computer-implemented method can further comprise executing, by the system, one or more shots of the running quantum program based on the at least one modified parameter.

According to another embodiment, a computer program product comprising a computer readable storage medium having program instructions embodied therewith, the program instructions executable by a processor to cause the processor to adjust at least one parameter corresponding to a running quantum program to define at least one modified parameter. The program instructions are further executable by the processor to cause the processor to execute one or more shots of the running quantum program based on the at least one modified parameter.

DETAILED DESCRIPTION

Figure 1:
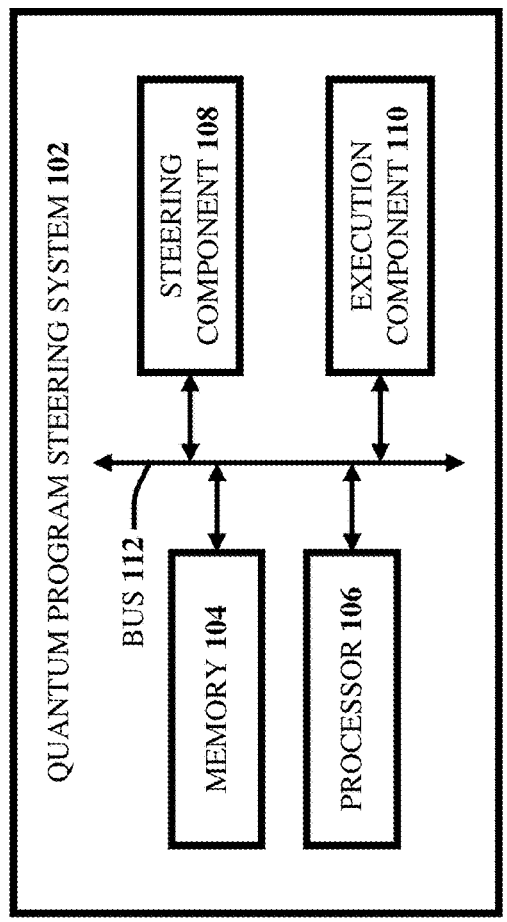
FIGS. 1 and 2 illustrate block diagrams of example, non-limiting systems that can each facilitate entity steering of a running quantum program in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As referenced herein, an "entity" can comprise a human, a client, a user, a computing device, a software application, an agent, a machine learning (ML) model, an artificial intelligence (AI), and/or another entity. It will be understood that when a component and/or an element is referred to herein as being "coupled" to another component and/or element, respectively, it can describe one or more different types of coupling including, but not limited to, communicative coupling, electrical coupling, operative coupling, optical coupling, physical coupling, and/or another type of coupling.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

As referenced herein, the terms below can be defined as follows.

"Qubit"—a quantum mechanical bit used in quantum computation.

"Quantum Processing Unit (QPU)"—a compute system built from qubits.

"Classical Processing Unit (CPU)"—a compute system built from classical bits (0 and 1).

"Quantum Job"—a single continuous unit of execution on a quantum processor by a single entity that consists of individual programs run serially.

"Quantum Instruction"—single unit of execution on a QPU, such as a gate or a pulse.

"Quantum Program"—a sequence of quantum instructions and classical compute instructions, performing some function on a quantum processor. Executed in single shots. Instructions can be altered between executions.

"Shot"—a single atomic unit of execution of a program, ending in one unit of data.

"Raw Data"—unprocessed measurement result data obtained from the quantum processor (e.g., scope channel readings).

"Processed Data"—measurement result data in an entity-desired format, following some processing on a classical compute unit.

"Classical Data Processing"—converts raw quantum data to processed data on a classical computer. May consist of elements such as kernels and discriminators.

"Live data"—measurement result data returned shot by shot in real time (e.g., while the job is still running).

"Steering"—entity-guided adjustments of classical data processing and/or hardware parameters (e.g., one or more parameters of a QPU). Can set custom metrics to determine these adjustments. Can be done live or have pre-programmed heuristics.

"Kernel"—processor that takes raw quantum readout data and integrates against some weight or kernel function. Result is complex-valued data. This is common in superconducting quantum systems, but may be found in other quantum compute architectures as well.

"Discriminator"—processor that maps non-binary to 0 and 1 output data. This is a common term is superconducting quantum systems, but analogous processors exist in other quantum compute architectures as well.

"Discriminated Data"—0 and 1 counts data that results from discriminator application.

"Classical Configuration"—parameters of the classical data processor, such as discriminator type, that can be updated at any time during job execution.

"Hardware Settings"—settings of the hardware (e.g., one or more parameters of a QPU such as, for instance, qubit local oscillator (LO) frequency) that can be updated between program executions.

Different quantum programs require different sets of optimized parameters for best performance. These parameters can include, but are not limited to, the quantum instructions themselves (e.g., pulse parameters for transmon qubits), hardware settings (e.g., the qubit LO frequency), and/or classical processing configurations (e.g., kernel and/or discriminator parameters).

In a typical quantum stack, an entity chooses a processing method prior to the start of a quantum program and manually reruns processing themselves or submits a new quantum job after the entire quantum program is complete to update these parameters. These processes are both inefficient and opaque to the entity using such a quantum stack. The standard model of quantum data processing consists of running a quantum job of many quantum programs, waiting for completion, and then performing classical data processing on the results. In addition to the overhead due to the classical data processing, an entity reruns entire quantum jobs to test different configurations (e.g., in quantum program, hardware settings, and/or classical data processing). This becomes extremely costly as program size scales. A problem with such existing technologies described above is that they do not enable an entity to choose between different quantum instructions, hardware settings, and/or classical data processing configurations live (e.g., in real-time), while the quantum job is still running.

As described below in accordance with one or more embodiments described herein, a live stream of results data can be provided and, based on such results data and/or other data, an entity can modify configurations while a quantum job is running. It should be appreciated that such one or more embodiments described herein can thereby provide a significant performance boost and substantially expand the parameter space considered by a quantum job. Applications of such one or more embodiments described herein can include, but are not limited to:

Live updates to classical configurations for data processing (e.g., kernels and/or discriminators);

Live hardware settings updates (e.g., qubit LO frequencies);

Live quantum instruction updates (e.g., pulse parameters for transmon qubits and/or a parameter of another quantum architecture); and/or Manual and/or automated entity steering metrics (e.g., running a quantum program until a given fitting accuracy is obtained).

Figure 2:
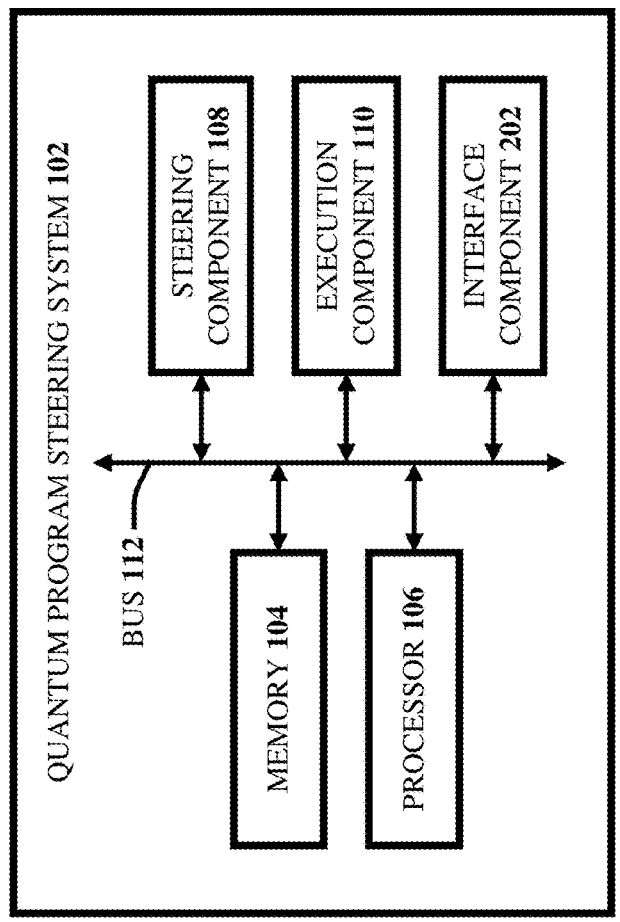

FIGS. 1 and 2 illustrate block diagrams of example, non-limiting systems 100 and 200, respectively, that can each facilitate entity steering of a running quantum program in accordance with one or more embodiments described herein. System 100 and 200 can each comprise a quantum program steering system 102. Quantum program steering system 102 of system 100 depicted in FIG. 1 can comprise a memory 104, a processor 106, a steering component 108, an execution component 110, and a bus 112. Quantum program steering system 102 of system 200 depicted in FIG. 2 can further comprise an interface component 202.

It should be appreciated that the embodiments described herein and/or depicted in various figures are for illustration only, and as such, the architecture of such embodiments are not limited to the systems, devices, and/or components depicted therein. For example, in some embodiments, system 100, system 200, and/or quantum program steering system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1, FIG. 2, and/or other figures disclosed herein.

Memory 104 can store one or more computer and/or machine readable, writable, and/or executable components and/or instructions that, when executed by processor 106 (e.g., a classical processor, a graphics processing unit (GPU), a quantum processor, and/or another type of processor), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to quantum program steering system 102, steering component 108, execution component 110, interface component 202, and/or another component associated with quantum program steering system 102 as described herein with or without reference to the various figures.

Memory 104 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 104 are described below with reference to system memory 816 and FIG. 8. Such examples of memory 104 can be employed to implement any embodiments described herein.

Processor 106 can comprise one or more types of processors and/or electronic circuitry (e.g., a classical processor (e.g., a central processing unit (CPU)), a GPU, a quantum processor (e.g., a quantum processing unit (QPU)), and/or another type of processor and/or electronic circuitry) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more CPU, multi-core processor, microprocessor, dual microprocessors, microcontroller, System on a Chip (SOC), array processor, vector processor, quantum processor, and/or another type of processor. In some embodiments, processor 106 can comprise a processing unit (e.g., a GPU) that has a greater number of cores (e.g., 100 times, 500 times, or 1000 times as many cores) than that of a classical processor (e.g., a CPU). In these embodiments, processor 106 can comprise such a processing unit (e.g., a GPU) that can provide a greater capacity to perform parallel processing and/or can comprise a larger memory bandwidth than that of classical processor (e.g., a CPU). For example, processor 106 can comprise a GPU that has a greater capacity to perform parallel processing (e.g., via a greater number of cores (e.g., 100 times, 500 times, or 1000 times as many cores) as a classical processor (e.g., a CPU)) and/or that has a larger memory bandwidth than that of a classical processor (e.g., a CPU). Further examples of processor 106 are described below with reference to processing unit 814 and FIG. 8. Such examples of processor 106 can be employed to implement any embodiments described herein.

Quantum program steering system 102, memory 104, processor 106, steering component 108, execution component 110, interface component 202, and/or another component of quantum program steering system 102 as described herein can be communicatively, electrically, operatively, and/or optically coupled to one another via bus 112 to perform functions of system 100, system 200, quantum program steering system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments described herein.

Quantum program steering system 102 can comprise any type of component, machine, device, facility, apparatus, and/or instrument that comprises a processor and/or can be capable of effective and/or operative communication with a wired and/or wireless network. All such embodiments are envisioned. For example, quantum program steering system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Quantum program steering system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, quantum program steering system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, quantum program steering system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet), a local area network (LAN), and/or another network. Quantum program steering system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, quantum program steering system 102 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between quantum program steering system 102 and external systems, sources, and/or devices (e.g., computing devices, communication devices, and/or another type of external system, source, and/or device).

Quantum program steering system 102 can comprise one or more computer and/or machine readable, writable, and/or executable components and/or instructions that, when executed by processor 106 (e.g., a classical processor, a GPU, a quantum processor, and/or another type of processor), can facilitate performance of operations defined by such component(s) and/or instruction(s). Further, in numerous embodiments, any component associated with quantum program steering system 102, as described herein with or without reference to the various figures, can comprise one or more computer and/or machine readable, writable, and/or executable components and/or instructions that, when executed by processor 106, can facilitate performance of operations defined by such component(s) and/or instruction(s). For example, steering component 108, execution component 110, interface component 202, and/or another component of, and/or associated with, quantum program steering system 102 as disclosed herein (e.g., communicatively, electronically, operatively, and/or optically coupled with and/or employed by quantum program steering system 102), can comprise such computer and/or machine readable, writable, and/or executable component(s) and/or instruction(s). Consequently, according to numerous embodiments, quantum program steering system 102 and/or any components of and/or associated therewith, as disclosed herein, can employ processor 106 to execute such computer and/or machine readable, writable, and/or executable component(s) and/or instruction(s) to facilitate performance of one or more operations described herein with reference to quantum program steering system 102 and/or any such components of and/or associated therewith.

Quantum program steering system 102 can facilitate (e.g., via processor 106) performance of operations executed by and/or associated with steering component 108, execution component 110, interface component 202, and/or another component of and/or associated with quantum program steering system 102 as disclosed herein. For example, as described in detail below, quantum program steering system 102 can facilitate (e.g., via processor 106): adjusting at least one parameter corresponding to a running quantum program to define at least one modified parameter; and/or executing one or more shots of the running quantum program based on the at least one modified parameter.

In another example, as described in detail below, quantum program steering system 102 can facilitate (e.g., via processor 106) adjusting the at least one parameter to define the at least one modified parameter based on measurement result data obtained from execution of the running quantum program using the at least one parameter.

In another example, as described in detail below, quantum program steering system 102 can facilitate (e.g., via processor 106) adjusting the at least one parameter to define the at least one modified parameter at one or more steering points in the running quantum program, where the one or more steering points are selected from a group consisting of: one or more defined steering points that are defined before or during execution of the running quantum program; one or more automated steering points that are automated using a pre-defined algorithm; and one or more manually adjusted steering points.

In another example, as described in detail below, quantum program steering system 102 can facilitate (e.g., via processor 106) executing the running quantum program based on the at least one modified parameter to reduce at least one of time or processing workload associated with determining a set of parameters that cause the running quantum program or a set of quantum programs to yield defined measurement result data.

In the examples above, the one or more shots can be indicative of one or more discrete atomic units of execution of the running quantum program that respectively yield a unit of quantum data. In the examples above, the one or more shots can comprise at least one of: one or more previous shots of the running quantum program; one or more current shots of the running quantum program; or one or more subsequently executed shots of the running quantum program. In the examples above, at least one of the at least one parameter or the at least one modified parameter are selected from a group consisting of: a classical data processing configuration parameter; a quantum hardware setting parameter (e.g., one or more parameters of a QPU such as, for instance, qubit local oscillator (LO) frequency); and a quantum instructions parameter (e.g., a parameter of the instructions of a quantum program).

In another example, as described in detail below, the at least one parameter can comprise a classical data processing configuration parameter and/or the at least one modified parameter can comprise a modified classical data processing configuration parameter, and quantum program steering system 102 can facilitate (e.g., via processor 106) executing the one or more shots of the running quantum program based on the modified classical data processing configuration parameter. In this example, the one or more shots can comprise at least one of: one or more current shots of the running quantum program; or one or more subsequently executed shots of the running quantum program.

As described below with reference to the example embodiments illustrated in FIGS. 3-5, steering component 108 and/or execution component 110 can each perform one or more of the above described operations that can be facilitated by quantum program steering system 102. In an example, steering component 108 can adjust at least one parameter corresponding to a running quantum program to define at least one modified parameter and execution component 110 can execute one or more shots of the running quantum program based on the at least one modified parameter. For instance, execution component 110 can employ a quantum computing device that can be external to quantum program steering system 102 to execute one or more shots of the running quantum program based on the at least one modified parameter. For example, to execute one or more shots of the running quantum program based on the at least one modified parameter, execution component 110 can employ a quantum computer, a quantum processor, quantum hardware, a simulator (e.g., a classical computer comprising quantum based simulation software), and/or another quantum computing device that can be external to quantum program steering system 102.

In various embodiments, the one or more shots can be indicative of one or more discrete atomic units of execution of the running quantum program that respectively yield a unit of quantum data. In multiple embodiments, the one or more shots can comprise: one or more previous shots of the running quantum program; one or more current shots of the running quantum program; and/or one or more subsequently executed shots of the running quantum program. In some embodiments, during execution of the running quantum program, steering component 108 can adjust the at least one parameter to define the at least one modified parameter. In these embodiments, during execution of the running quantum program, execution component 110 can execute one or more previous shots, one or more current shots, and/or one or more subsequently executed shots of the running quantum program based on the at least one modified parameter.

In various embodiments described herein, the at least one parameter and/or the at least one modified parameter can comprise a classical data processing configuration parameter, a quantum hardware setting parameter, and/or a quantum instructions parameter. For example, in one embodiment, the at least one parameter can comprise a classical data processing configuration parameter and the at least one modified parameter can comprise a modified classical data processing configuration parameter. In this example embodiment, execution component 110 can execute the one or more shots of the running quantum program based on the modified classical data processing configuration parameter. In this example embodiment, the one or more shots can comprise: one or more current shots of the running quantum program; and/or one or more subsequently executed shots of the running quantum program.

In another example, steering component 108 can adjust the at least one parameter to define the at least one modified parameter based on measurement result data obtained from execution of the running quantum program using the at least one parameter. That is, for instance, the running quantum program can yield certain measurement result data using the at least one parameter as input and steering component 108 can adjust (e.g., during execution of the running quantum program) the at least one parameter to define the at least one modified parameter based on such certain measurement result data. In this example, execution component 110 can execute (e.g., during execution of the running quantum program) one or more previous shots, one or more current shots, and/or one or more subsequently executed shots of the running quantum program based on the at least one modified parameter.

In another example, steering component 108 can adjust the at least one parameter to define the at least one modified parameter at one or more steering points in the running quantum program. In multiple embodiments described herein, such one or more steering points can comprise: one or more defined steering points that can be defined before or during execution of the running quantum program; one or more automated steering points that can be automated using a pre-defined algorithm; and/or one or more manually adjusted steering points.

In another example, execution component 110 can execute the running quantum program based on the at least one modified parameter to reduce at least one of time or processing workload (e.g., computational cost) associated with determining a set of parameters (e.g., optimized parameters) that cause the running quantum program and/or a set of quantum programs to yield defined measurement result data (e.g., desired measurement result data and/or measurement result data that is relatively better (e.g., in terms of fidelity, accuracy, and/or another metric) than other measurement result data produced using another parameter and/or set(s) of parameters).

In some embodiments, an entity as defined herein can employ interface component 202 to obtain measurement result data generated by executing the running quantum program and/or to input instructions and/or commands to quantum program steering system 102. For example, in some embodiments, interface component 202 can comprise a graphical user interface (GUI), an application programming interface (API), a representational state transfer (REST) API, and/or another interface component. In these example embodiments, such an entity can employ interface component 202 to obtain measurement result data generated by executing the running quantum program and/or to input (e.g., based on such measurement result data) instructions and/or commands to quantum program steering system 102 that can: enable steering component 108 to adjust at least one parameter corresponding to the running quantum program to define at least one modified parameter; and/or enable execution component 110 to execute (e.g., via a quantum computing device that can be external to quantum program steering system 102) one or more shots of the running quantum program based on the at least one modified parameter.

It should be appreciated that quantum program steering system 102 can comprise a live (e.g., real-time), entity steering system that allows such an entity to implement manual and/or automated steering points (e.g., at will) throughout the execution of a quantum program to optimize, for example, classical configuration (e.g., classical settings and/or classical data processing settings), hardware settings, and/or quantum instructions. In some embodiments, quantum program steering system 102 can run initial live data (e.g., data obtained during execution of a quantum program) through a set of classical configurations. In these embodiments, once a certain classical configuration is chosen (e.g., via automated metrics or manual decision by an entity), quantum program steering system 102 can run such a classical configuration on one or more shots of a quantum program. For example, quantum program steering system 102 can run such a classical configuration on the next shots of the quantum program until the next steering point, until the end of the quantum job comprising the quantum program, and/or optionally, on retro processed data.

In some embodiments, quantum program steering system 102 can execute a process that is analogous to the process described above for modification of a classical configuration but with hardware settings and/or quantum instructions. It should be noted that the difference between the three processes respectively corresponding to modification of classical configurations, hardware settings, and quantum instructions is that quantum program steering system 102 can rerun a quantum program for new and/or modified hardware settings and/or quantum instructions, whereas quantum program steering system 102 can rerun only the analysis for new and/or modified classical settings, which can happen while a quantum processing unit (QPU) is executing one or more quantum programs. In various embodiments, an entity as defined herein that implements quantum program steering system 102 can tune any subset of parameters at the same time (e.g., at the same steering point and/or concurrently). A flowchart of the above described quantum program steering process that can be executed by quantum program steering system 102 in accordance with one or more embodiments described herein is depicted in FIG. 3 and described below.

Figure 3:
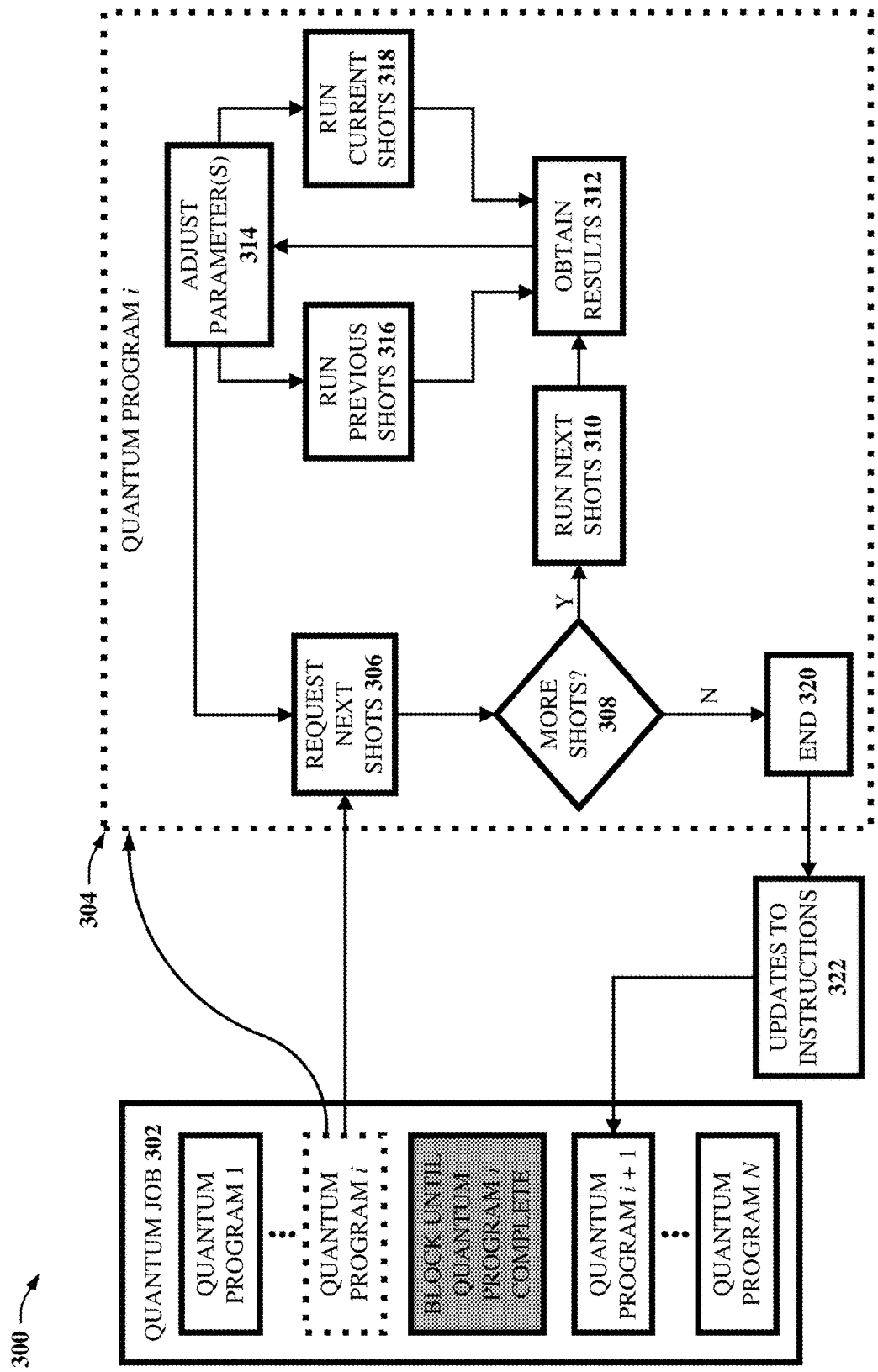
FIG. 3 illustrates a flowchart of an example, non-limiting process that can be implemented to facilitate entity steering of a running quantum program in accordance with one or more embodiments described herein.

FIG. 3 illustrates a flowchart of an example, non-limiting process 300 that can be implemented to facilitate entity steering of a running quantum program in accordance with one or more embodiments described herein. Repetitive description of like elements and/or processes employed in respective embodiments is omitted for sake of brevity.

Process 300 can comprise a computer-implemented process that can be implemented in accordance with one or more embodiments described herein to execute a quantum job that can comprise one or more quantum programs. In the example embodiment illustrated in FIG. 3, an entity as defined herein can employ quantum program steering system 102 to implement process 300 in accordance with one or more embodiments described herein to execute a quantum job 302 that can comprise one or more quantum programs. In this example embodiment, quantum job 302 can comprise discrete quantum programs denoted as "quantum program 1," "quantum program i," "quantum program i+1," and/or "quantum program N," where "N" denotes the total quantity of quantum programs in quantum job 302.

In the example embodiment depicted in FIG. 3, process 300 can comprise execution of quantum program i in accordance with one or more embodiments described herein, where such execution of quantum program i is illustrated in inset view 304 depicted in FIG. 3. In this example embodiment, while quantum program i is being executed, quantum program steering system 102 can prevent execution of a subsequent quantum program in quantum job 302 (e.g., quantum program i+1 and/or quantum program N) until execution of quantum program i is complete.

As illustrated by inset view 304, at step 306 of process 300, next shots of quantum program i can be requested (e.g., via quantum program steering system 102). In this example embodiment, at step 308 of process 300, it can be determined (e.g., via quantum program steering system 102) whether there are more shots of quantum program i that can be run. If it is determined at step 308 that there are more shots of quantum program i that can be run, execution component 110 can execute such shots at step 310 of process 300. For example, execution component 110 can execute such shots at step 310 using, for instance, a quantum computing device (e.g., a quantum processor) that can be external to quantum program steering system 102 as described above with reference to FIGS. 1 and 2.

In the example embodiment depicted in FIG. 3, based on running such shots at step 310 as described above, an entity employing quantum program steering system 102 can obtain results (e.g., measurement results data) at step 312 of process 300. For example, such an entity can obtain such results at step 312 using interface component 202 of quantum program steering system 102.

As illustrated in the example embodiment depicted in FIG. 3, based on obtaining such results at step 312, an entity employing quantum program steering system 102 can use interface component 202 to instruct steering component 108 to adjust one or more parameters corresponding to quantum program i at step 314 of process 300. For example, during execution of quantum program i, such an entity can use interface component 202 to instruct steering component 108 to adjust one or more parameters that can include, but are not limited to, a classical data processing configuration parameter, a quantum hardware setting parameter, a quantum instructions parameter, and/or another parameter corresponding to quantum program i.

In the example embodiment depicted in FIG. 3, based on adjusting such one or more parameters at step 314 as described above, steering component 108 can thereby define one or more modified parameters corresponding to quantum program i. In this example embodiment, execution component 110 can use such one or more modified parameters as input to run (e.g., during execution of quantum program i and/or before completion of quantum program i) one or more shots of quantum program i. For example, at step 316 of process 300, execution component 110 can use such one or more modified parameters as input to run (e.g., during execution of quantum program i and/or before completion of quantum program i) one or more previous shots (e.g., previously executed shot(s)) of quantum program i. In another example, at step 318 of process 300, execution component 110 can use such one or more modified parameters as input to run (e.g., during execution of quantum program i and/or before completion of quantum program i) one or more current shots (e.g., shot(s) run at step 310) of quantum program i. In another example, execution component 110 can use such one or more modified parameters as input to run (e.g., during execution of quantum program i and/or before completion of quantum program i) one or more next shots (e.g., subsequently executed shot(s)) of quantum program i. For instance, if quantum program steering system 102 requests next shots at step 306 and/or determines there are more shots at 308 as described above, execution component 110 can use the above described one or more modified parameters as input to run (e.g., during execution of quantum program i and/or before completion of quantum program i) one or more next shots (e.g., subsequently executed shot(s)) of quantum program i at step 310 of process 300.

In some embodiments, such an entity employing quantum program steering system 102 can instruct quantum program steering system 102 (e.g., via interface component 202) to repeat steps 306, 308, 310, 312, 314, 316, and/or 318 of process 300 until: a) defined measurement result data is obtained at step 312 (e.g., desired measurement result data and/or measurement result data that is relatively better (e.g., in terms of fidelity, accuracy, and/or another metric) than other measurement result data produced using another parameter and/or set(s) of parameters); and/or b) it is determined (e.g., via quantum program steering system 102) at step 308 that there are no more shots to be executed in quantum program i. If it is determined at step 308 that there are no more shots to be executed in quantum program i, such an entity employing quantum program steering system 102 to implement process 300 can instruct (e.g., via interface component 202) quantum program steering system 102 to end process 300 at step 320. In some embodiments, based on ending process 300 at step 320, quantum program steering system 102 can provide updates to instructions (e.g., quantum based instructions) to quantum job 302 and/or one or more quantum programs thereof (e.g., quantum program i+1) at step 322 of process 300. In these embodiments, quantum job 302 and/or one or more quantum programs thereof (e.g., quantum program i+1) can be executed (e.g., via quantum program steering system 102) using such updated instructions as input.

It should be appreciated that termination of process 300 and/or quantum program i can occur anywhere within execution of a quantum program, however, for readability purposes, only step 320 is described here and depicted in the example embodiment illustrated in FIG. 3. It should also be appreciated that, in the example embodiment depicted in FIG. 3, process 300 itself, the sub-process of process 300 that is illustrated in inset view 304, and/or step 314 of process 300 can constitute a steering point(s). In some embodiments, quantum program steering system 102 and/or an entity implementing quantum program steering system 102 can define one or more other steering points in, for example, process 300 itself, quantum job 302, and/or the sub-process of process 300 that is illustrated in inset view 304. In some embodiments, quantum program steering system 102 and/or an entity implementing quantum program steering system 102 can pre-define such steering point(s) prior to the start of quantum job 302. In some embodiments, such an entity implementing quantum program steering system 102 can manually define and/or trigger such steering point(s) while quantum job 302 is running In some embodiments, one or more steering parameters (e.g., one or more new and/or modified classical data processing configuration parameters, quantum hardware setting parameters, and/or quantum instructions parameters) can be determined from a pre-determined algorithm (e.g., a pre-programmed heuristic) that can be chosen by the entity implementing quantum program steering system 102. In some embodiments, such one or more steering parameters can be manually chosen by the entity via interface component 202 (e.g., an interactive dashboard and/or interface component 400 described below and illustrated in FIG. 4) where such an entity can tune the classical processing configurations, hardware settings, and/or quantum instructions.

Figure 4:
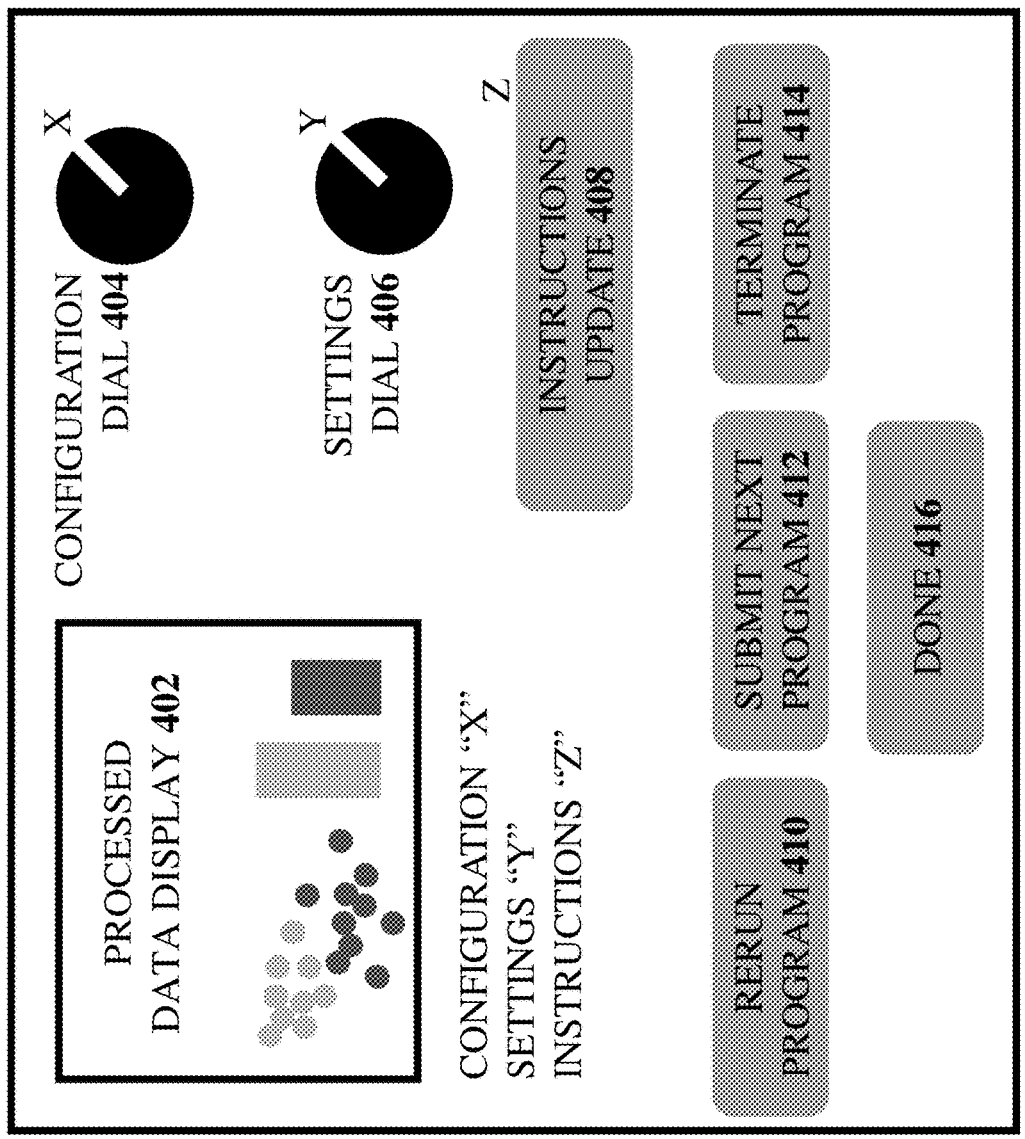
FIG. 4 illustrates a diagram of an example, non-limiting interface component that can facilitate entity steering of a running quantum program in accordance with one or more embodiments described herein.

FIG. 4 illustrates a diagram of an example, non-limiting interface component 400 that can facilitate entity steering of a running quantum program in accordance with one or more embodiments described herein. Repetitive description of like elements and/or processes employed in respective embodiments is omitted for sake of brevity.

In some embodiments, interface component 400 can comprise the same structure and/or functionality as that of interface component 202 described above with reference to FIGS. 2 and 3. Therefore, for example, interface component 400 can be used to perform one or more of the operations of interface component 202 in accordance with one or more embodiments described herein.

Interface component 400 (e.g., and therefore, interface component 202) can comprise one or more input and/or output devices. As illustrated in the example embodiment depicted in FIG. 4, interface component 400 (e.g., and therefore, interface component 202) can comprise one or more input and/or output devices that can include, but are not limited to: a processed data display 402; a configuration dial 404; a settings dial 406; an instructions update 408 button; a rerun program 410 button; a submit next program 412 button; a terminate program 414 button; and/or a done 416 button.

Processed data display 402 can render measurement results data that can be obtained from executing one or more quantum jobs (e.g., quantum job 302), one or more quantum programs (e.g., quantum program i), and/or one or more shots of a quantum program. Based on such measurement results data, an entity as defined herein that implements quantum program steering system 102 in accordance with one or more embodiments described herein can use configuration dial 404, settings dial 406, and/or instructions update 408 button to instruct steering component 108 to adjust a classical data processing configuration parameter, a quantum hardware setting parameter, and/or a quantum instructions parameter, respectively, of a quantum program (e.g., a running quantum program). Such an entity can use rerun program 410 button, submit next program 412 button, terminate program 414 button, and/or done 416 button to facilitate one or more operations of quantum program steering system 102 and/or execution component 110 in accordance with one or more embodiments described herein. For example, such an entity can use rerun program 410 button to instruct execution component 110 to run one or more previously executed and/or currently executed shots of a running quantum program using one or more modified parameters that have been adjusted by steering component 108 as described above.

Figure 5:
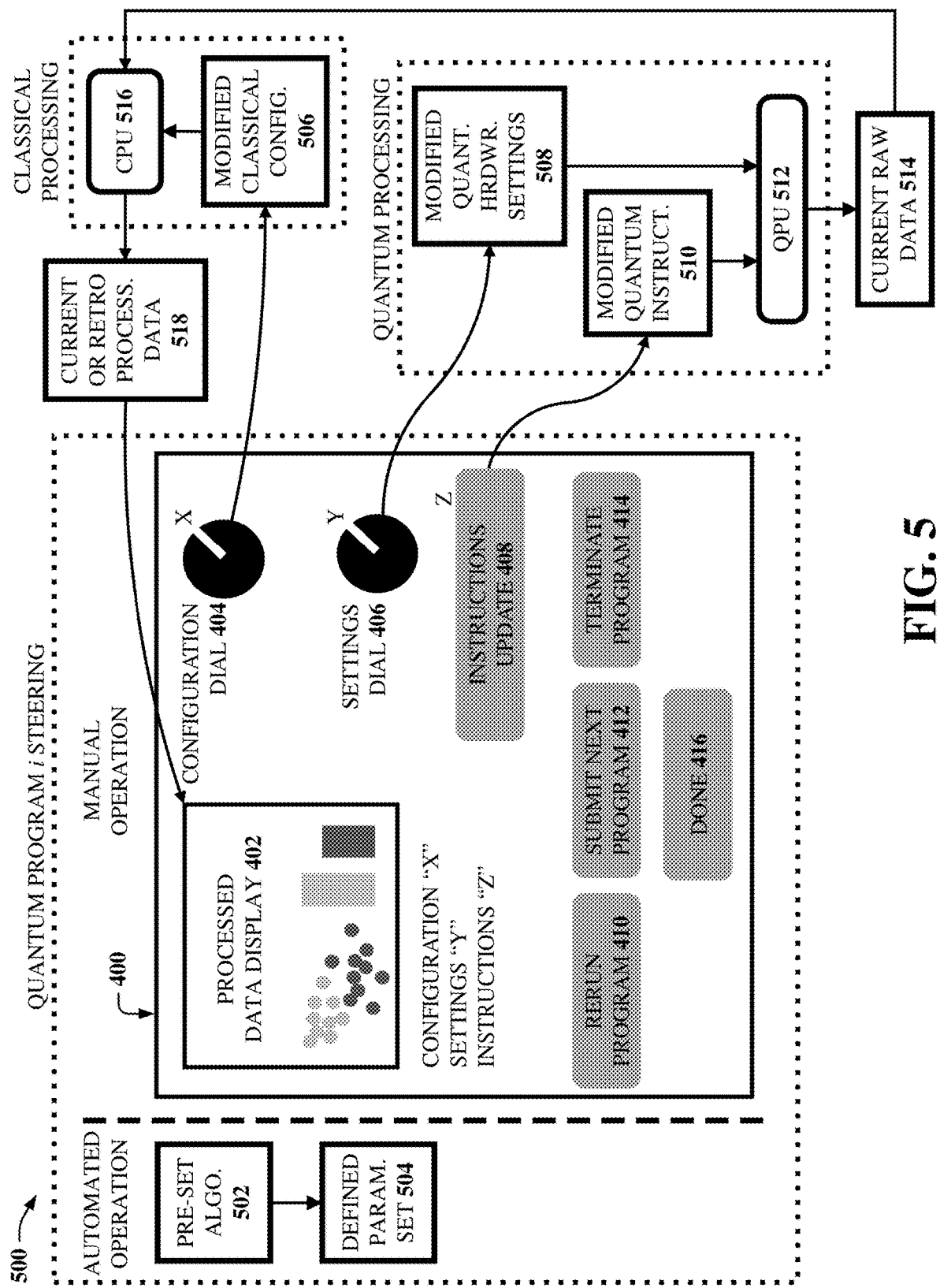
FIG. 5 illustrates a block diagram of an example, non-limiting system 500 that can facilitate entity steering of a running quantum program in accordance with one or more embodiments described herein.

FIG. 5 illustrates a block diagram of an example, non-limiting system 500 that can facilitate entity steering of a running quantum program in accordance with one or more embodiments described herein. Repetitive description of like elements and/or processes employed in respective embodiments is omitted for sake of brevity.

In some embodiments, an entity as defined herein can employ quantum program steering system 102 and/or system 500 to facilitate entity steering of a running quantum program (e.g., quantum program i) in accordance with one or more embodiments described herein. In some embodiments, an entity as defined herein can employ quantum program steering system 102 and/or system 500 to implement process 300 described above and illustrated in FIG. 3.

As illustrated in the example embodiment depicted in FIG. 5, system 500 can comprise quantum program steering (denoted as "QUANTUM PROGRAM i STEERING" in FIG. 5), quantum processing, and classical processing. In this example embodiment, the quantum program steering (e.g., of quantum program i) can be performed via manual operation and/or automated operation in accordance with one or more embodiments described herein. For example, to perform manual quantum program steering (e.g., of quantum program i) in accordance with one or more embodiments described herein, an entity that implements quantum program steering system 102 and/or system 500 can use interface component 400 described above and illustrated in FIGS. 4 and 5 to adjust one or more parameters corresponding to a running quantum program (e.g., a classical data processing configuration parameter, a quantum hardware setting parameter, a quantum instructions parameter and/or another parameter of quantum program i). In another example, to perform automated quantum program steering (e.g., of quantum program i) in accordance with one or more embodiments described herein, an entity that implements quantum program steering system 102 and/or system 500 can instruct such system(s) to use one or more pre-set algorithms 502 (denoted as "PRE-SET ALGO. 502" in FIG. 5) to determine one or more parameters and/or a set(s) of parameters that cause the running quantum program (e.g., quantum program i) or a set of quantum programs (e.g., quantum programs of quantum job 302) to yield defined measurement result data. For instance, to perform automated quantum program steering (e.g., of quantum program i) in accordance with one or more embodiments described herein, such an entity can instruct (e.g., via interface component 202 and/or interface component 400) quantum program steering system 102, steering component 108, and/or system 500 to use one or more pre-programmed heuristics, machine learning models, and/or artificial intelligence models that can be trained and/or learn (e.g., via one or more supervised and/or unsupervised techniques) to infer and/or determine defined parameter set 504 (denoted as "DEFINED PARAM. SET 504" in FIG. 5).

In embodiments where the entity elects to manually perform quantum program steering (e.g., of quantum program i) using quantum program steering system 102 and/or system 500 in accordance with one or more embodiments described herein, such an entity can use interface component 400 as illustrated in FIG. 5 to adjust one or more parameters corresponding to the running quantum program (e.g., quantum program i) and thereby define one or more modified parameters corresponding to the running quantum program. For example, in these embodiments, such an entity can use configuration dial 404, settings dial 406, and/or instructions update 408 button of interface component 400 to respectively define modified classical configuration 506 (denoted as "MODIFIED CLASSICAL CONFIG. 506" in FIG. 5), modified quantum hardware settings 508 (denoted as "MODIFIED QUANT. HRDWR. SETTINGS 508" in FIG. 5), and/or modified quantum instructions 510 (denoted as "MODIFIED QUANTUM INSTRUCT. 510" in FIG. 5). It should be appreciated that, in embodiments where the entity elects to have quantum program steering system 102 and/or system 500 automatically perform quantum program steering (e.g., of quantum program i) in accordance with one or more embodiments described herein, defined parameter set 504, which can be generated by pre-set algorithm 502 as described above, can comprise modified classical configuration 506, modified quantum hardware settings 508, and/or modified quantum instructions 510.

In the example embodiment illustrated in FIG. 5, based on defining modified classical configuration 506 and/or modified quantum hardware settings 508 (e.g., manually or automatically as described above), the entity can instruct (e.g., via interface component 202 and/or interface component 400) quantum program steering system 102, execution component 110, and/or system 500 to perform quantum processing of the running quantum program (e.g., quantum program i) using such modified quantum hardware settings 508 and/or modified quantum instructions 510 as input. For example, based on defining modified classical configuration 506 and/or modified quantum hardware settings 508 (e.g., manually or automatically as described above), the entity can instruct (e.g., via interface component 202 and/or interface component 400) quantum program steering system 102, execution component 110, and/or system 500 to employ quantum processing unit 512 (denoted as "QPU 512" in FIG. 5) to execute one or more shots of the running quantum program (e.g., quantum program i) using such modified quantum hardware settings 508 and/or modified quantum instructions 510 as input. As illustrated in the example embodiment depicted in FIG. 5, quantum processing unit 512 can generate current raw data 514 using modified quantum hardware settings 508 and/or modified quantum instructions 510 as input, where such current raw data 514 can comprise unprocessed measurement result data (e.g., scope channel readings).

In the example embodiment illustrated in FIG. 5, based on defining modified classical configuration 506 (e.g., manually or automatically as described above), the entity can instruct (e.g., via interface component 202 and/or interface component 400) quantum program steering system 102, execution component 110, and/or system 500 to perform classical processing of the running quantum program (e.g., quantum program i) using such modified classical configuration 506 as input. For example, based on defining modified classical configuration 506 (e.g., manually or automatically as described above), the entity can instruct (e.g., via interface component 202 and/or interface component 400) quantum program steering system 102, execution component 110, and/or system 500 to employ central processing unit 516 (denoted as "CPU 516" in FIG. 5) to process current raw data 514 using such modified classical configuration 506. As illustrated in the example embodiment depicted in FIG. 5, central processing unit 516 can generate current or retro processed data 518 (denoted as "CURRENT OR RETRO PROCESS. DATA 518" in FIG. 5) using modified classical configuration 506 and/or current raw data 514 as input. In this example embodiment, based on such processing by central processing unit 516, interface component 400 can render such current or retro processed data 518 on processed data display 402.

In the example embodiment depicted in FIG. 5, based on such display of current or retro processed data 518 on processed data display 402, the entity implementing quantum program steering system 102 and/or system 500 can determine how to proceed in accordance with one or more embodiments described herein. For instance, based on such display of current or retro processed data 518 on processed data display 402, the entity can instruct (e.g., via interface component 202 and/or interface component 400) quantum program steering system 102 and/or system 500 to: rerun (e.g., via execution component 110) the running quantum program (e.g., quantum program i) via rerun program 410 button; submit the next quantum program (e.g., quantum program i+1) via submit next program 412 button; terminate the program (e.g., quantum program i) via terminate program 414 button; and/or end the quantum program steering process (e.g., process 300) and/or the quantum job (e.g., quantum job 302) comprising the running quantum program (e.g., quantum program i) via done 416 button.

Figure 6:
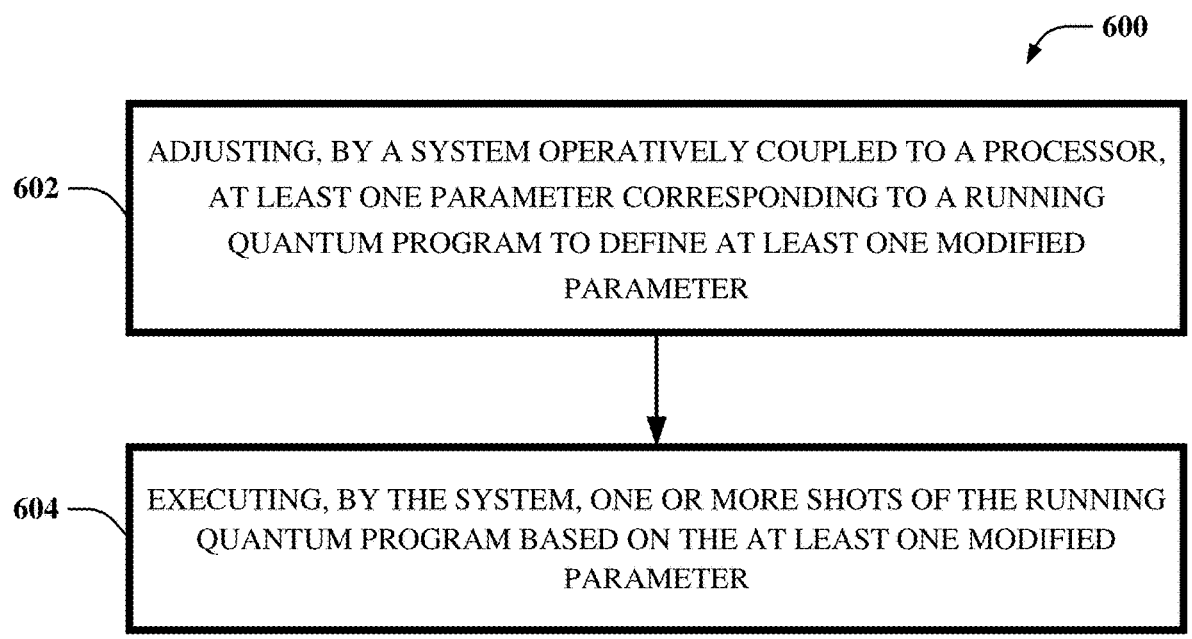
FIGS. 6 and 7 illustrate flow diagrams of example, non-limiting computer-implemented methods that can each facilitate entity steering of a running quantum program in accordance with one or more embodiments described herein.

FIG. 6 illustrates a flow diagram of an example, non-limiting computer-implemented method 600 that can facilitate entity steering of a running quantum program in accordance with one or more embodiments described herein. Repetitive description of like elements and/or processes employed in respective embodiments is omitted for sake of brevity.

At 602, computer-implemented method 600 can comprise adjusting, by a system (e.g., via quantum program steering system 102 and/or steering component 108) operatively coupled to a processor (e.g., processor 106), at least one parameter (e.g., a classical data processing configuration parameter, a quantum hardware setting parameter, a quantum instructions parameter, and/or another parameter) corresponding to a running quantum program (e.g., quantum program i) to define at least one modified parameter (e.g., modified classical configuration 506, modified quantum hardware settings 508, modified quantum instructions 510, and/or another modified parameter).

At 604, computer-implemented method 600 can comprise executing, by the system (e.g., via quantum program steering system 102, execution component 110, and/or a QPU that can be external to quantum program steering system 102), one or more shots (e.g., one or more previously executed shots, currently executed shots, or subsequently executed shots) of the running quantum program based on the at least one modified parameter.

Figure 7:
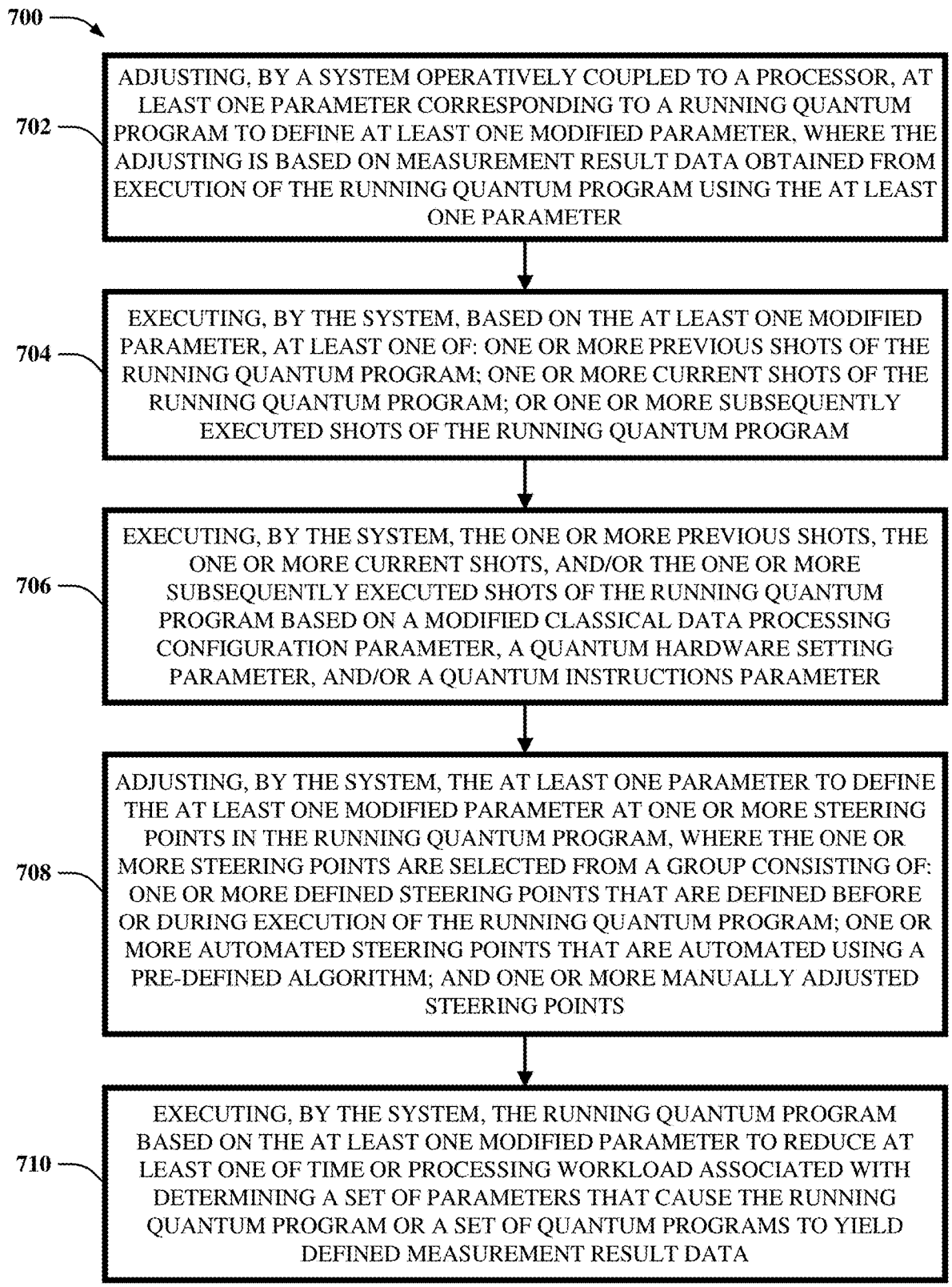

FIG. 7 illustrates a flow diagram of an example, non-limiting computer-implemented method 700 that can facilitate entity steering of a running quantum program in accordance with one or more embodiments described herein. Repetitive description of like elements and/or processes employed in respective embodiments is omitted for sake of brevity.

At 702, computer-implemented method 700 can comprise adjusting, by a system (e.g., via quantum program steering system 102 and/or steering component 108) operatively coupled to a processor (e.g., processor 106), at least one parameter corresponding to a running quantum program to define at least one modified parameter, where the adjusting is based on measurement result data obtained from execution of the running quantum program using the at least one parameter.

At 704, computer-implemented method 700 can comprise executing, by the system (e.g., via quantum program steering system 102 and/or execution component 110), based on the at least one modified parameter, at least one of: one or more previous shots of the running quantum program; one or more current shots of the running quantum program; or one or more subsequently executed shots of the running quantum program.

At 706, computer-implemented method 700 can comprise executing, by the system (e.g., via quantum program steering system 102 and/or execution component 110), the one or more previous shots, the one or more current shots, and/or the one or more subsequently executed shots of the running quantum program based on a modified classical data processing configuration parameter, a quantum hardware setting parameter, and/or a quantum instructions parameter.

At 708, computer-implemented method 700 can comprise adjusting, by the system (e.g., via quantum program steering system 102 and/or steering component 108), the at least one parameter to define the at least one modified parameter at one or more steering points in the running quantum program, where the one or more steering points are selected from a group consisting of: one or more defined steering points that are defined before or during execution of the running quantum program; one or more automated steering points that are automated using a pre-defined algorithm; and one or more manually adjusted steering points.

At 710, computer-implemented method 700 can comprise executing, by the system (e.g., via quantum program steering system 102 and/or execution component 110), the running quantum program based on the at least one modified parameter to reduce at least one of time or processing workload associated with determining a set of parameters that cause the running quantum program or a set of quantum programs to yield defined measurement result data.

Quantum program steering system 102 can be associated with various technologies. For example, quantum program steering system 102 can be associated with quantum computing technologies, quantum software and/or middleware technologies, quantum job technologies, quantum program technologies, quantum program parameter optimization technologies, quantum hardware and/or software technologies, quantum algorithm technologies, machine learning technologies, artificial intelligence technologies, cloud computing technologies, knowledge base technologies, and/or other technologies.

Quantum program steering system 102 can provide technical improvements to systems, devices, components, operational steps, and/or processing steps associated with the various technologies identified above. For example, quantum program steering system 102 can adjust at least one parameter corresponding to a running quantum program to define at least one modified parameter; and/or execute one or more shots of the running quantum program based on the at least one modified parameter. In this example, quantum program steering system 102 can perform such operations while the running quantum program is still running, thereby enabling execution of the one or more shots using one or more different classical configuration, hardware settings, and/or quantum instructions parameters corresponding to the running quantum program before it stops running In this example, by enabling such execution of the one or more shots using such different parameter(s) while the running quantum program is still running, quantum program steering system 102 can thereby reduce the time and/or processing workload associated with determining a set of parameters (e.g., optimized parameters) that cause the running quantum program or a set of quantum programs to yield defined measurement result data.

In another example, by enabling modification of hardware settings and/or quantum instructions corresponding to a running quantum program while the quantum program is still running, quantum program steering system 102 can enable tuning of a wide range of quantum parameters within a quantum job. Some examples can include, but are not limited to anharmonicity and invocation of higher energy levels in a transmon qubit or equivalent architectures; qubit level frequencies; general Hamiltonian of a qubit circuit; coupling parameters and tuning of qubit-qubit interactions; tuning of gate calibrations and pulse profiles (e.g., see Rabi example described below); and/or temperature of the quantum system bath for quantum thermodynamics applications.

Other examples of technical improvements that can be provided by quantum program steering system 102 can include, but are not limited to: performance gains (e.g., of a processing unit (e.g., a CPU and/or a QPU) in examining large parameter spaces; substantially improved experience of an entity implementing quantum program steering system 102 (e.g., quantum program steering system 102 gives such an entity the control of quantum jobs while they are still running at both hardware, software, and quantum instruction levels); flexibility (e.g., quantum program steering system 102 can provide automated and/or manually defined steering instructions to a QPU and/or a CPU and/or quantum program steering system 102 can allow for pre-set steering points to be defined before quantum job execution and/or during execution); experimentalist usage (e.g., quantum program steering system 102 can simplify monitoring and/or experimentation by enabling live program modification); and/or avoid drift of experimental parameters over time (e.g., as time between quantum jobs can be substantial, especially with a queueing system).

Additionally, or alternatively, in accordance with one or more embodiments described herein, it should be appreciated that quantum program steering system 102 can allow an entity to modify classical data processing while a quantum job is still running. The following is a non-limiting example of such a modification that can be performed by an entity using quantum program steering system 102 in accordance with one or more embodiments described herein Example—Classical Data Processing Modification
a) The entity can employ quantum program steering system 102 to run a calibration experiment w/2000 shots.
b) Quantum program steering system 102 can obtain discriminated data for 500 shots using linear discriminant analysis.
c) If poor accuracy for the fitter is observed, quantum program steering system 102 can change the discriminator to use quadratic discriminant analysis.
d) After another 500 shots, if the fitting score is still not satisfactory, quantum program steering system 102 can provide a custom hardware fitter with specific parameters optimized for the quantum readout hardware.
e) After another 500 shots, if the fitting is sufficient, quantum program steering system 102 can let the rest of the experiment continue.
f) Quantum program steering system 102 can discard the first 1000 shots with the inferior fitters and keep the 1000 shots with the custom hardware fitter and/or retroactively refit the first 1000 shots using the hardware fitter.

Additionally, or alternatively, in accordance with one or more embodiments described herein, it should be appreciated that quantum program steering system 102 can allow an entity to modify hardware settings while a quantum job is still running. The following is a non-limiting example (e.g., a spectroscopy example) of such a modification that can be performed by an entity using quantum program steering system 102 in accordance with one or more embodiments described herein. In the following example, a given quantum program has N shots and the quantum program applies a Gaussian pulse at variable qubit LO frequency and then does a measurement.

Example—Hardware Settings Modification
a) Suppose the entity wants to scan m frequencies. The entity can employ quantum program steering system 102 to run N/m shots at an initial estimate frequency.
b) Quantum program steering system 102 can obtain the averaged kernelled signal, increase the LO frequency (e.g., slightly), and run another N/m shots.
c) Quantum program steering system 102 can obtain the averaged signal from these shots. If the desired optimum point has been found, quantum program steering system 102 can terminate the quantum job early. Or if the signal is larger, quantum program steering system 102 can increase the LO frequency again and run another N/m shots. Otherwise, quantum program steering system 102 can rerun with the LO frequency reduced (e.g., slightly reduced). In this example, it is assumed that there is a frequency maximum.

d) Quantum program steering system 102 can continue until m signals are obtained.

Additionally, or alternatively, in accordance with one or more embodiments described herein, it should be appreciated that quantum program steering system 102 can allow an entity to modify the instructions of a quantum program being executed while a quantum job comprising the quantum program is still running. The following is a non-limiting example (e.g., a pulse shape optimization for Rabi experiment example) of such a modification that can be performed by an entity using quantum program steering system 102 in accordance with one or more embodiments described herein. In the following example, a given pulse-based quantum program has N shots and the program applies a Rabi pulse with a certain profile that rotates the $|0\rangle$ qubit state toward the $|1\rangle$ qubit state and then does a measurement. The experiment described in the example below is performed on a single qubit.

Example—Quantum Instructions Modification a) Suppose the entity wants to try m pulse profiles to find the optimal pulse amplitude. In this program, quantum program steering system 102 can compute the $|1\rangle$ state probability as output (e.g., quantum program steering system 102 can obtain discriminated data and divide the number of ones by the number of shots). Therefore, optimal pulse is expected to be a relative maximum around one. To begin, the entity and/or quantum program steering system 102 can choose an initial amplitude composing an initial pulse profile (e.g., this should be in the vicinity of the actual amplitude for convergence). The entity can employ quantum program steering system 102 to run N/m shots at the initial pulse profile.

b) Quantum program steering system 102 can obtain the output counts signal from the discriminated data, increase the pulse amplitude (e.g., slightly), and run another N/m shots.

c) Quantum program steering system 102 can obtain the counts signal from these shots. If the desired optimum point has been found, quantum program steering system 102 can terminate the quantum job early. Or if the signal is larger, quantum program steering system 102 can increase the pulse amplitude again and run another N/m shots. Otherwise, quantum program steering system 102 can rerun with the pulse amplitude reduced (e.g., slightly reduced). In this example, it is assumed that there is an optimal pulse amplitude in this search space.

d) Quantum program steering system 102 can continue until m signals are obtained, then determine the optimal pulse profile.

Quantum program steering system 102 can provide technical improvements to a processing unit (e.g., processor 106, a quantum processor, and/or another processor) associated with quantum program steering system 102. For example, as described above, by enabling execution of one or more shots of a running quantum program using one or more different parameters (e.g., a modified classical configuration parameter, a modified quantum hardware setting parameter, and/or a modified quantum instructions parameter) while the running quantum program is still running, quantum program steering system 102 can thereby reduce the time and/or processing workload associated with determining a set of parameters (e.g., optimized parameters) that cause the running quantum program or a set of quantum programs to yield defined measurement result data. In this example, quantum program steering system 102 can thereby reduce computational cost of a processing unit (e.g., a CPU, a QPU, and/or another processing unit) used to examine large parameter spaces and/or further improve the performance and/or efficiency of such a processing unit.

A practical application of quantum program steering system 102 is that it can be implemented in a quantum system to reduce the time and/or computational costs associated with examining a large parameter space of parameters corresponding to a quantum job and/or a quantum program that can be executed by the quantum system to compute one or more solutions (e.g., heuristic(s)) to a variety of problems ranging in complexity (e.g., an estimation problem, an optimization problem, and/or another problem) in a variety of domains (e.g., finance, chemistry, medicine, transportation, logistics, and/or another domain). For example, a practical application of quantum program steering system 102 is that it can be implemented in a quantum system to reduce the time and/or computational costs associated with determining a set of parameters (e.g., optimized parameters) that cause the quantum job, the quantum program, and/or a set of quantum programs to yield defined measurement result data, where the quantum job, quantum program, and/or set of quantum programs can be executed by the quantum system to compute one or more solutions (e.g., heuristic(s)) to an estimation problem and/or an optimization problem in the domain of chemistry, medicine, and/or finance. In this example, such one or more solutions can be used to engineer, for instance, a new chemical compound, a new medication, and/or a new financial derivative pricing scheme.

It should be appreciated that quantum program steering system 102 provides a new approach driven by relatively new quantum computing technologies. For example, quantum program steering system 102 provides a new approach to reduce time and/or computational costs associated with determining a set of parameters (e.g., optimized parameters) that cause a quantum job, a quantum program, and/or a set of quantum programs to yield defined measurement result data.

Quantum program steering system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Quantum program steering system 102 and/or components thereof, can be employed to solve new problems that arise through advancements in technologies mentioned above, employment of quantum computing systems, cloud computing systems, computer architecture, and/or another technology.

It is to be appreciated that quantum program steering system 102 can utilize various combinations of electrical components, mechanical components, and circuitry that cannot be replicated in the mind of a human or performed by a human, as the various operations that can be executed by quantum program steering system 102 and/or components thereof as described herein are operations that are greater than the capability of a human mind. For instance, the amount of data processed, the speed of processing such data, or the types of data processed by quantum program steering system 102 over a certain period of time can be greater, faster, or different than the amount, speed, or data type that can be processed by a human mind over the same period of time.

According to several embodiments, quantum program steering system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that quantum program steering system 102 can include information that is impossible to obtain manually by an entity, such as a human user. For example, the type, amount, and/or variety of information included in quantum program steering system 102, steering component 108, execution component 110, and/or interface component 202 can be more complex than information obtained manually by a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
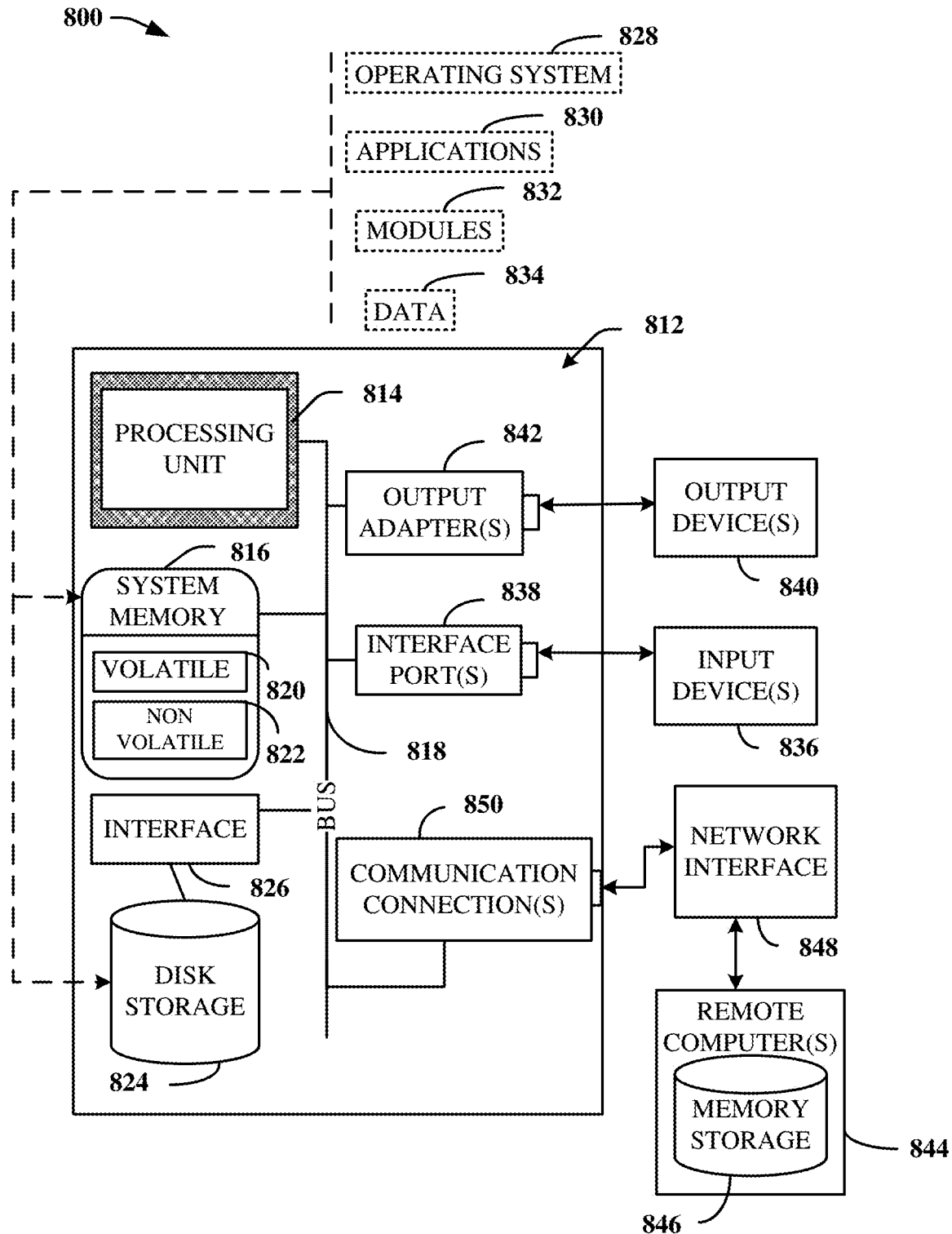
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing one or more embodiments described herein can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that one or more embodiments described herein can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

In some embodiments, quantum program steering system 102 can be associated with a cloud computing environment. For example, quantum program steering system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Quantum program steering system 102 and/or components thereof (e.g., steering component 108, execution component 110, interface component 202, and/or another component) can employ one or more computing resources of cloud computing environment 950 described below with reference to FIG. 9 and/or one or more functional abstraction layers (e.g., quantum software) described below with reference to FIG. 10 to execute one or more operations in accordance with one or more embodiments described herein. For example, cloud computing environment 950 and/or such one or more functional abstraction layers can comprise one or more classical computing devices (e.g., classical computer, classical processor, virtual machine, server, and/or another classical computing device), quantum hardware, and/or quantum software (e.g., quantum computing device, quantum computer, quantum processor, quantum circuit simulation software, superconducting circuit, and/or other quantum hardware and/or quantum software) that can be employed by quantum program steering system 102 and/or components thereof to execute one or more operations in accordance with one or more embodiments described herein. For instance, quantum program steering system 102 and/or components thereof can employ such one or more classical and/or quantum computing resources to execute one or more classical and/or quantum: mathematical function, calculation, and/or equation; computing and/or processing script, routine, and/or instruction; algorithm; model (e.g., artificial intelligence (AI) model, machine learning (ML) model, and/or another type of model); and/or another operation in accordance with one or more embodiments described herein.

It is to be understood that although a detailed description on cloud computing is provided herein, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
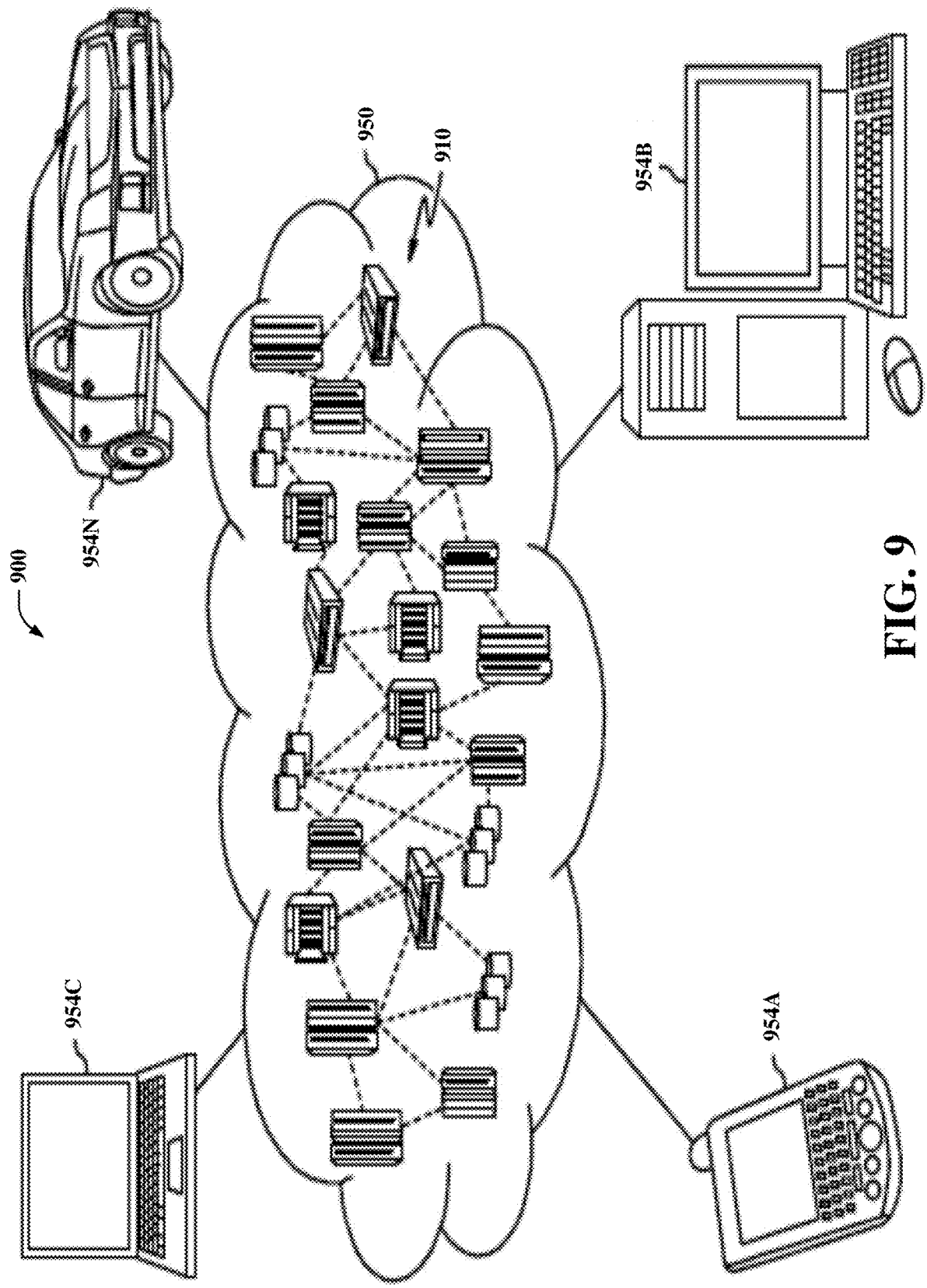
FIG. 9 illustrates a block diagram of an example, non-limiting cloud computing environment in accordance with one or more embodiments described herein.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, and/or another quantum platform) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
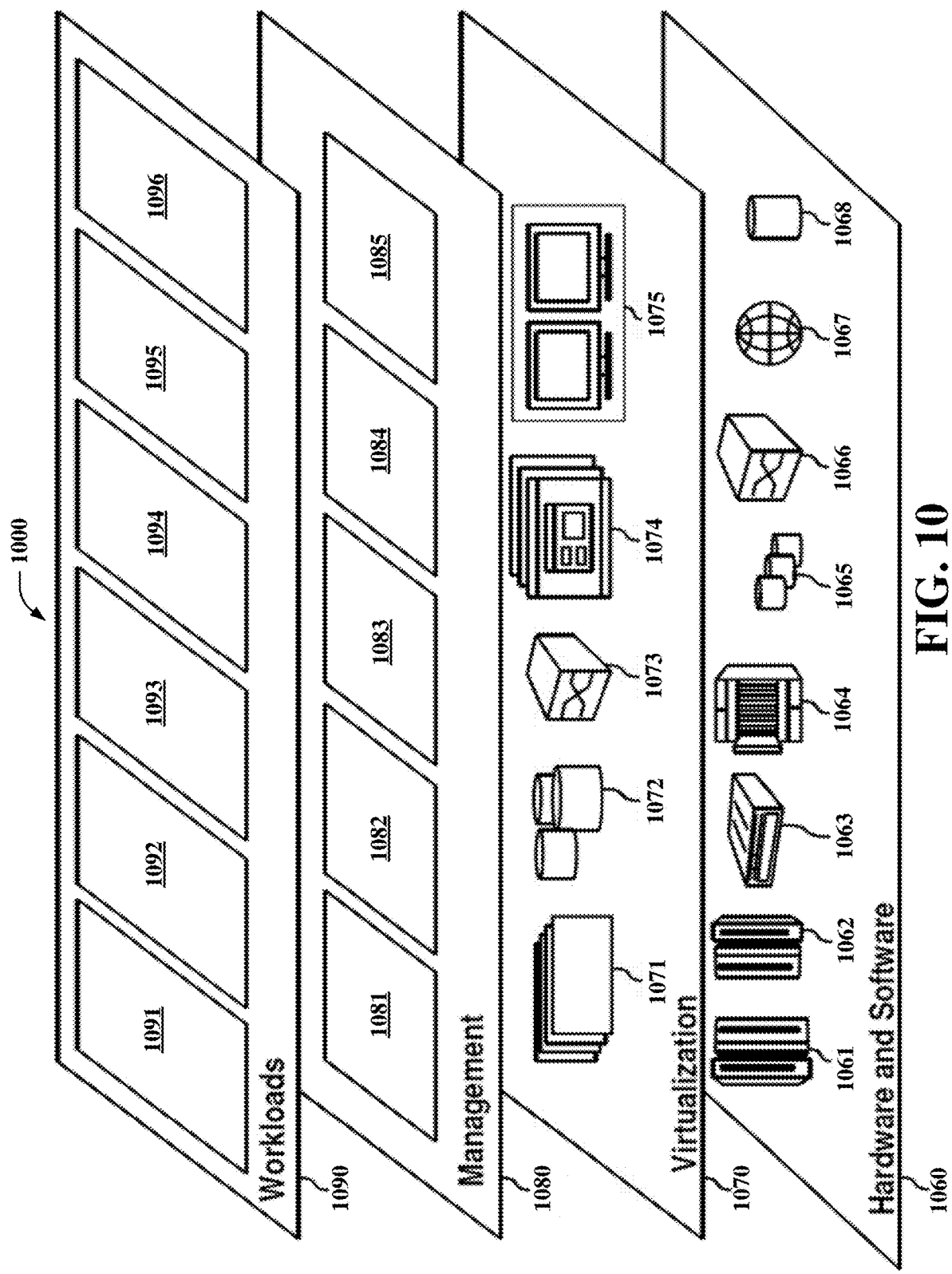
FIG. 10 illustrates a block diagram of example, non-limiting abstraction model layers in accordance with one or more embodiments described herein.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068. Although not illustrated in FIG. 10, in some embodiments, hardware and software layer 1060 can comprise one or more quantum hardware components (e.g., a quantum processor, a quantum computer, and/or another quantum hardware component) and/or one or more quantum software components (e.g., quantum platform routing software and/or another quantum software component).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and quantum program steering software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Python, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that one or more embodiments described herein also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of one or more embodiments described herein can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor (e.g., a classical processor (e.g., a CPU) and/or a quantum processor (e.g., a QPU)) can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. As used herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments herein, but one of ordinary skill in the art can recognize that many further combinations and permutations of one or more embodiments described herein are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer executable components stored in memory, the computer executable components comprising:
a steering component that adjusts at least one parameter corresponding to a running quantum program to define at least one modified parameter; and
an execution component that executes one or more shots of the running quantum program based on the at least one modified parameter.

2. The system of claim 1, wherein the one or more shots are indicative of one or more discrete atomic units of execution of the running quantum program that respectively yield a unit of quantum data, and wherein the one or more shots comprise at least one of: one or more previous shots of the running quantum program; one or more current shots of the running quantum program; or one or more subsequently executed shots of the running quantum program.

3. The system of claim 1, wherein the at least one parameter comprises a classical data processing configuration parameter, the at least one modified parameter comprises a modified classical data processing configuration parameter, and the execution component executes the one or more shots of the running quantum program based on the modified classical data processing configuration parameter, and wherein the one or more shots comprise at least one of: one or more current shots of the running quantum program; or one or more subsequently executed shots of the running quantum program.

4. The system of claim 1, wherein the steering component adjusts the at least one parameter to define the at least one modified parameter based on measurement result data obtained from execution of the running quantum program using the at least one parameter.

5. The system of claim 1, wherein at least one of the at least one parameter or the at least one modified parameter are selected from a group consisting of a classical data processing configuration parameter, a quantum hardware setting parameter, and a quantum instructions parameter.

6. The system of claim 1, wherein the steering component adjusts the at least one parameter to define the at least one modified parameter at one or more steering points in the running quantum program, and wherein the one or more steering points are selected from a group consisting of: one or more defined steering points that are defined before or during execution of the running quantum program; one or more automated steering points that are automated using a pre-defined algorithm; and one or more manually adjusted steering points.

7. The system of claim 1, wherein the execution component executes the running quantum program based on the at least one modified parameter to reduce at least one of time or processing workload associated with determining a set of parameters that cause the running quantum program or a set of quantum programs to yield defined measurement result data.

8. A computer-implemented method, comprising:
adjusting, by a system operatively coupled to a processor, at least one parameter corresponding to a running quantum program to define at least one modified parameter; and
executing, by the system, one or more shots of the running quantum program based on the at least one modified parameter.

9. The computer-implemented method of claim 8, wherein the one or more shots are indicative of one or more discrete atomic units of execution of the running quantum program that respectively yield a unit of quantum data, and wherein the one or more shots comprise at least one of: one or more previous shots of the running quantum program; one or more current shots of the running quantum program; or one or more subsequently executed shots of the running quantum program.

10. The computer-implemented method of claim 8, wherein the at least one parameter comprises a classical data processing configuration parameter and the at least one modified parameter comprises a modified classical data processing configuration parameter, and further comprising:
executing, by the system, the one or more shots of the running quantum program based on the modified classical data processing configuration parameter, wherein the one or more shots comprise at least one of: one or more current shots of the running quantum program; or one or more subsequently executed shots of the running quantum program.

11. The computer-implemented method of claim 8, further comprising:
adjusting, by the system, the at least one parameter to define the at least one modified parameter based on measurement result data obtained from execution of the running quantum program using the at least one parameter.

12. The computer-implemented method of claim 8, wherein at least one of the at least one parameter or the at least one modified parameter are selected from a group consisting of a classical data processing configuration parameter, a quantum hardware setting parameter, and a quantum instructions parameter.

13. The computer-implemented method of claim 8, further comprising:
adjusting, by the system, the at least one parameter to define the at least one modified parameter at one or more steering points in the running quantum program, wherein the one or more steering points are selected from a group consisting of: one or more defined steering points that are defined before or during execution of the running quantum program; one or more automated steering points that are automated using a pre-defined algorithm; and one or more manually adjusted steering points.

14. The computer-implemented method of claim 8, further comprising:
executing, by the system, the running quantum program based on the at least one modified parameter to reduce at least one of time or processing workload associated with determining a set of parameters that cause the running quantum program or a set of quantum programs to yield defined measurement result data.

15. A computer program product comprising a computer readable storage medium having program instructions embodied therewith, the program instructions executable by a processor to cause the processor to:
adjust at least one parameter corresponding to a running quantum program to define at least one modified parameter; and
execute one or more shots of the running quantum program based on the at least one modified parameter.

16. The computer program product of claim 15, wherein the one or more shots are indicative of one or more discrete atomic units of execution of the running quantum program that respectively yield a unit of quantum data, and wherein the one or more shots comprise at least one of: one or more previous shots of the running quantum program; one or more current shots of the running quantum program; or one or more subsequently executed shots of the running quantum program.

17. The computer program product of claim 15, wherein the at least one parameter comprises a classical data processing configuration parameter and the at least one modified parameter comprises a modified classical data processing configuration parameter, and the program instructions are further executable by the processor to cause the processor to:
  execute the one or more shots of the running quantum program based on the modified classical data processing configuration parameter, wherein the one or more shots comprise at least one of: one or more current shots of the running quantum program; or one or more subsequently executed shots of the running quantum program.

18. The computer program product of claim 15, wherein the program instructions are further executable by the processor to cause the processor to:
  adjust the at least one parameter to define the at least one modified parameter based on measurement result data obtained from execution of the running quantum program using the at least one parameter.

19. The computer program product of claim 15, wherein at least one of the at least one parameter or the at least one modified parameter are selected from a group consisting of a classical data processing configuration parameter, a quantum hardware setting parameter, and a quantum instructions parameter.

20. The computer program product of claim 15, wherein the program instructions are further executable by the processor to cause the processor to:
  adjust the at least one parameter to define the at least one modified parameter at one or more steering points in the running quantum program, and wherein the one or more steering points are selected from a group consisting of: one or more defined steering points that are defined before or during execution of the running quantum program; one or more automated steering points that are automated using a pre-defined algorithm; and one or more manually adjusted steering points.

* * * * *